United States Patent [19]
Taylor

[11] 3,791,210
[45] Feb. 12, 1974

[54] CABLE TENSION MEASURING DEVICE

[75] Inventor: Lucian W. Taylor, San Jose, Calif.

[73] Assignee: Velcon Filters, Inc., San Jose, Calif.

[22] Filed: May 17, 1972

[21] Appl. No.: 254,094

[52] U.S. Cl. .............................................. 73/143
[51] Int. Cl. ............................................. G01l 5/06
[58] Field of Search 73/143, 141 A, 141 R, 95, 88 R

[56] References Cited
UNITED STATES PATENTS

| | | | |
|---|---|---|---|
| 2,927,458 | 3/1960 | Moon, Jr. et al. | 73/141 A |
| 2,071,694 | 2/1937 | Howe | 73/143 UX |
| 2,387,737 | 10/1945 | Black | 73/143 |

Primary Examiner—Jerry W. Myracle
Attorney, Agent, or Firm—Wilson & Fraser

[57] ABSTRACT

A cable tension measuring device which utilizes the relative movement of its component members under tension to indicate the point at which a desired cable tension is reached. In one form the device uses the elongation of a cylinder under tension to release a collar held between the cylinder ends. In an alternative form, the device uses the separation of the sides of a U-shaped body under tension to prevent the movement of the indicating means.

5 Claims, 5 Drawing Figures

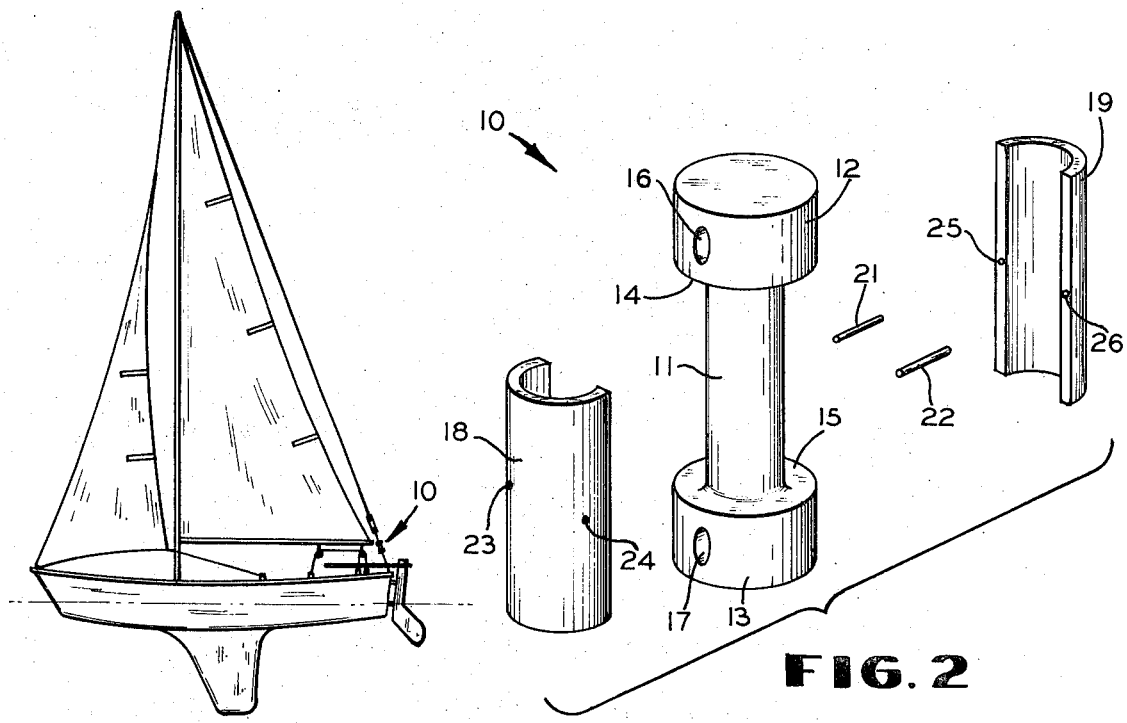
FIG. 1
FIG. 2
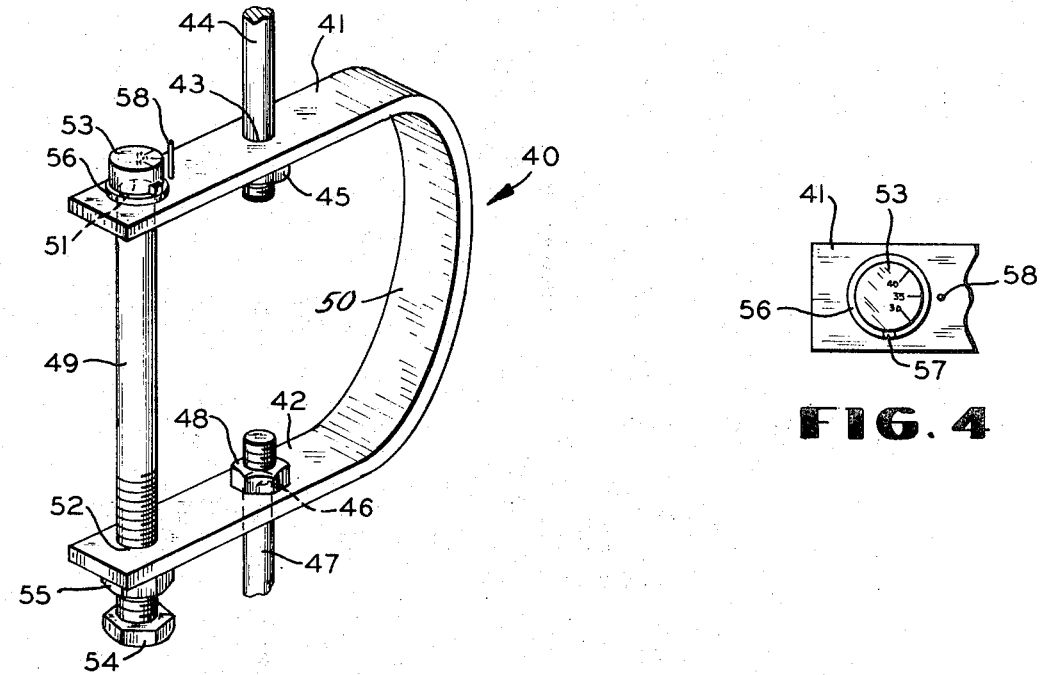
FIG. 3
FIG. 4

CABLE TENSION MEASURING DEVICE

DESCRIPTION OF THE PRIOR ART

In many cases, it is desirable to determine whether a cable is set for the proper tension without releasing the cable to insert a measuring device. Prior to this time devices for measuring the tension have been divided into two groups. The first group is composed of mechanisms which are attached to the cable without releasing it and then removed. However, these devices involve a great deal of work to obtain a single measurement. The second group is permanently inserted between the cable and the anchor point. But this type of measuring has had a high failure rate and is difficult to maintain in calibration.

SUMMARY OF THE INVENTION

It is an object of the present invention to provide a tension measuring device which can be permanently installed with the cable.

Another object of the invention is to provide a simple means to determine when a cable has been adjusted to a predetermined tension.

Still another object of the invention is to provide a cable tension measuring device which will maintain its calibration.

BRIEF DESCRIPTION OF THE DRAWINGS

Other objects and advantages of the invention will become readily apparent to those skilled in the art from reading the following detailed description of an embodiment of the invention when considered in the light of the accompanying drawings, in which:

FIG. 1 is a view of the invention employed as a part of the back stay of a sailboat;

FIG. 2 is an exploded perspective view of the invention in the form of a cylinder and collar;

FIG. 3 is a perspective view of the invention in the form of a U-shaped body and a bolt with indicating head;

FIG. 4 is a fragmentary top view of the indicating head of the embodiment of the invention illustrated in FIG. 3.

DETAILED DESCRIPTION OF THE PREFERRED EMBODIMENT

Figure 5:
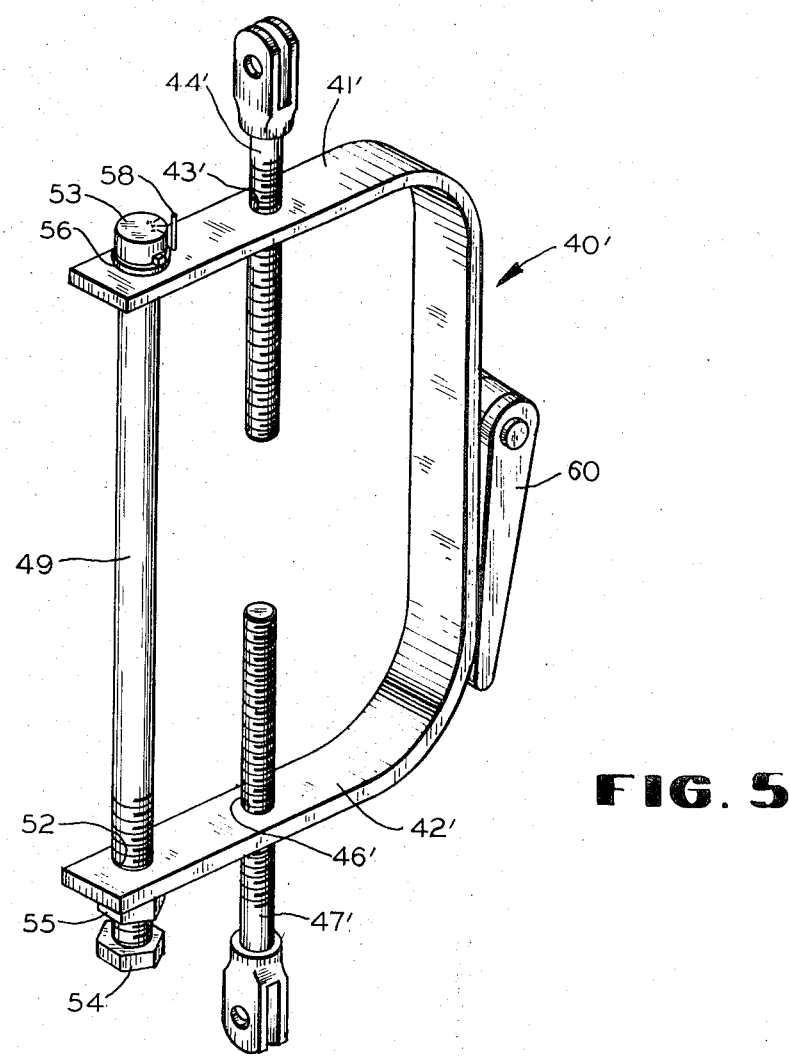
FIG. 5 is a perspective view of another embodiment of the invention wherein a turnbuckle device is incorporated as an integral part of the structure.

FIG. 1 illustrates the invention as employed in a sailboat, wherein the invention is integrated as a part of the rigging of a sailboat to effectively determine the tension on the back stay of the boat. While the specific tension requirements will be different for different sailboats, in all instances the tension under which the back stay is to be placed can be expressed as the tension just before the boat hull is distorted.

Referring to FIGS. 1 and 2, there is shown an embodiment of the present invention. Generally indicated by reference numeral 10 is the main body member which comprises a center section 11 and two end sections 12 and 13 of generally circular cross-section. The center section 11 is of a smaller diameter than the two end sections 12 and 13 which are typically substantially identical in dimensions. The surfaces of the end or shoulder sections 14 and 15 adjacent to the center section 11 are parallel to each other and perpendicular to the longitudinal axis of the center section 11. Conveniently there are holes 16 and 17 in end sections 12 and 13, respectively which serve as means to attach the device to the ends of cables such as comprise the back stay arrangement of a sailboat, for example, and these holes are typically perpendicular to the longitudinal axis of the body. It is apparent however, that other means for attaching may be utilized without departing from the scope of the invention.

A collar formed from substantially identical halves 18 and 19 is inserted between the shoulders 14 and 15 of the end sections 12 and 13. The halves are secured together by two pins 21 and 22 which are press-fitted into holes 23 and 24 in collar half 18 and holes 25 and 26 in collar half 19. Advantageously, the holes 23, 24, 25 and 26 extend from the adjacent surfaces of the collar halves 18 and 19 to the exterior surfaces and the ends of the pins 21 and 22 are formed to be flush with the exterior surfaces of the collar halves. This provides a smooth exterior surface for the device to prevent its interfering with or causing damage to a nearby cable or other object. If the device requires disassembly the pins can, with facility, be pressed out of the holes and the collar halves separated. The interior diameter of the assembled collar is slightly larger than the diameter of the body center section 11, therefore, the collar may be rotated about the center section.

The body 10 is formed from a material, such as stainless steel, which will resist corrosion from a hostile environment. This material, when under tension, will elongate in accordance with Hooke's law in the elastic region. Hooke's law is stated, $$1 = PL_1/AE \tag{1}$$

where, 1 is the amount of elongation
P is the tensile force applied
$L_1$ is the distance between the reference points when the body is not under tension, in this case the distance between surfaces 14 and 15
A is the cross-sectional area of the center section 11
E is the modulus of elasticity for the material.

If the distance between the surfaces 14 and 15 when the body is under tension is designated as $L_2$ then, $$L_2 = L_1 + 1 \tag{2}$$

This equation shows that $L_2$ is directly proportional to the elongation. The axial length of the collar, designated as $L_3$, is greater than $L_1$, so that when there is no tension on the body the collar is trapped between the surfaces 14 and 15 which prevents it from rotating. As tensile force is applied to the device body, $L_2$ increases as 1 does and at a specific tensile force, designated as $P_1$, $L_2$ becomes slightly greater than $L_3$ allowing the collar to be rotated and indicating tension $P_1$ has been reached. For a given set of body dimensions and a given material the distance $L_2$ can be calculated and the length of the collar $L_3$ can be determined for the amount of tension it is desired to indicate. To calibrate the device during manufacture the body would be subjected to a known tension and $L_2$ would be measured.

Then the collar would be machined to the exact length $L_3$ that is necessary to indicate the known tension.

The device will function equally well when installed between the cable and an anchor point at any intermediate point in the cable. As long as the tensile force applied does not exceed the elastic region the device will never require calibration.

If it is desired to indicate more than one value of tension with the same cable tension measuring device the invention may take the general form illustrated in FIGS. 3 and 4. The device body, generally designated by reference numeral 40, is formed from material with a rectangular cross-section. As before this material may be stainless steel which will resist corrosion. The end sections 41 and 42 are parallel to each other so that the body 40 is in the shape of the letter "U." The upper end section 41 has a hole 43 through which a rod 44 is passed. The end of the rod is threaded and secured by a nut 45. The opposite end of the rod is attached to the end of the cable to which the tension is to be applied. In a similar fashion the lower end section 42 also contains a hole 46 through which a rod 47 is passed which has a nut 48 on the threaded end. The opposite end of rod 47 is attached to an anchor point or a cable end. As tension is applied to the cable the rods 44 and 47 secured by nuts 45 and 48 act upon the end sections 41 and 42 to increase the distance between them.

A bolt 49 is passed through holes 51 and 52 near the extemities of end sections 41 and 42 respectively. The bolt diameter is slightly less than the hole diameters and it is free to rotate. Attached to the upper end of the bolt is a round head 53 and the opposite end of the bolt is threaded. Securely fastened to the threaded end of the bolt is a nut 54 which is utilized to rotate the bolt as will be described. Between the nut 54 and the body end section 42 is a lock nut 55 which provides a stop, as does round head 53, when tension on the cable separates end sections 41 and 42. An indicating washer 56 is placed on the bolt 49 between the round head 53 and the upper end section 41. The washer may be rotated about the bolt using tab 57 when there is no tension on the cable. As tension is applied to the cable end sections 41 and 42 separate and move along the bolt 49 until, at a specific tension, end section 42 rests against lock nut 55 and end section 41 forces indicating washer 56 against round head 53 so that the washer cannot be rotated.

When there is no tension on the cable the distance, designated as $L_1$, between the upper surface of end section 41 and the lower surface of end section 42 is less than the distance, designated as $L_2$, between the lower surface of washer 56 and the upper surface of lock nut 55.

If "1" is the deflection caused by a specific tension P, then P will be indicated when $$L_2 = L_1 + 1 \tag{3}$$

The body 40 is comprised of two straight end sections 41 and 42 and a semi-circular center section 50. The end sections may be treated as cantilever beams where the deflection at the bolt is $$l_1 = Pa^2(3b-a)/6EI \tag{4}$$

where,
$l_1$ is the amount of deflection
$P$ is the tensile force
$a$ is the distance from the center of holes 43 and 46 to the point the body begins to curve
$b$ is the distance from the center of holes 51 and 52 to the point the body begins to curve
$E$ is the modulus of elasticity for the material
$I$ is the moment of inertia of the cross-section
For a rectangular cross-section, $$I = wh^3/12 \tag{5}$$

where,
$w$ is the width of the cross-section
$h$ is the height of the cross-section The curved portion of the body will be subjected to a combination of elongation and deflection. However, the values of elongation and deflection will be small as compared with the deflection at the bolt and they may be ignored for this illustration. For a given set of body dimensions and a given material the deflection "1" can be computed at the desired tension and therefore, the lock nut 55 can be set to obtain the value of $L_2$ to make $L_2 = L_1 + 1$. "1" will be equal to the deflection of both end sections or $2 l_1$.

To calibrate the device a known tension is applied to rods 44 and 47. Referring to FIG. 3, attached to end section 41 is pin 58. Reference marks on the round head 53 indicate different values of tension, for example "30" for 3,000 pounds. If the known tension is 3,000 pounds the "30" mark is aligned with pin 58 and lock nut 55 is adjusted until indicating washer 56 can no longer be rotated. Then, in turn, 3,500 and 4,000 pounds can be applied and the head 53 rotated by turning nut 54 until indicating washer 56 can no longer be turned. The head 53 can then be marked to align a "35" and a "40" with the pin 58. The device will stay in calibration as long as lock nut 55 is not moved or the tension does not exceed the elastic region.

While the embodiment of the invention illustrated in FIG. 3 and 4 show the hole 52 in the end section 42 as being smooth, it must be understood that in certain applications of the invention, it may be desirable to provide the hole 52 with internal threads to cooperate with the exterior threads of the bolt 49.

It will be appreciated from the above description that the invention has numerous applications for determining tension in cable systems. One particular application of the invention which has considerable merit is in the rigging of a sailboat wherein the device embodying the features of the invention is incorporated as an integral part of the rigging and the typical turnbuckle-type tensioning means is employed to vary the tension to the desired degree.

FIG. 5 illustrates a modified form of the invention shown in FIGS. 3 and 4 wherein the holes 43' and 46' of the end sections 41' and 42', respectively, of the device body 40' are provided with internal threads. The internal threads of the holes 43' and 46' are adopted to receive the threaded end portions of the rods 44' and 47', respectively. The opposite ends of the rods 44' and 47' are provided with attaching means of any suitable design for interconnection with a cable and anchoring means, for example. It will be noted that when the device body 40' is rotated in one direction, the spacing between the rods 44' and 47' is reduced, and when the device body is rotated in an opposite direction, the spacing between the rods 44' and 47' is increased. Thereby, the tension applied to the associated cable system may be reduced or increased by the amount the device body 40' is rotated. The device body 40' is further provided with a pivotally mounted handle 60 which will facilitate the rotational movement of the body 40' and will manifestly act as a lever arm when pivoted to an outward position.

In accordance with the patent statutes, I have explained the principle and mode of operation of my invention and have illustrated and described what I now consider to represent its best embodiments; however, it is to be understood that within the spirit and scope of the appended claims the invention may be practiced otherwise than as specifically illustrated and described.

What I claim is:

1. A system for measuring tension comprising:
   a cable;
   an elongate cylindrical body having opposed end sections, said end sections being of a larger diameter than the center section of said body thereby forming opposing shoulder portions;
   means for connecting said body between said cable and an anchoring means; and
   indicating means attached to said body between said shoulder portions, said indicating means being movable with respect to said body as a function of tension applied to said cable.

2. A combination according to claim 1 in which said means for connecting said body between said cable and said anchoring means includes a hole in each of said end sections extending generally perpendicularly to the longitudinal axis of said body.

3. A combination according to claim 2 wherein said indicating means includes a collar having an inside diameter slightly greater than the diameter of said center section of said body and a length slightly less than the distance between said opposing shoulder portions of said end sections when said cable is subjected to a predetermined tension.

4. A combination according to claim 1 wherein said body includes a bolt with a lock nut threaded on the end of said bolt, a rectangular cross-section formed in the shape of the letter "U" with two straight end sections and a curved center section and a hole in each of said straight end sections, said bolt passing through said holes and wherein said indicating means includes a washer under the head of said bolt with a tab at its periphery for hand grasping to facilitate rotation of said washer.

5. A combination according to claim 1 wherein said body includes a bolt with a lock nut threaded on the end of said bolt, a rectangular cross-section formed in the shape of the letter "U" with two straight end sections and a curved center section and a hole in each of said straight end sections, said bolt passing through said holes and wherein said indicating means includes a nut fastened to the threaded end of said bolt, indicating marks on the head of said bolt, and a pin attached to said straight end section and adjacent to the head of said bolt to provide a reference for indicating relative rotation of the head of said bolt.

* * * * *